Feb. 26, 1963   R. R. GREENE ETAL   3,079,139
TAPERED SPRING LEAF
Filed April 20, 1960   3 Sheets-Sheet 1
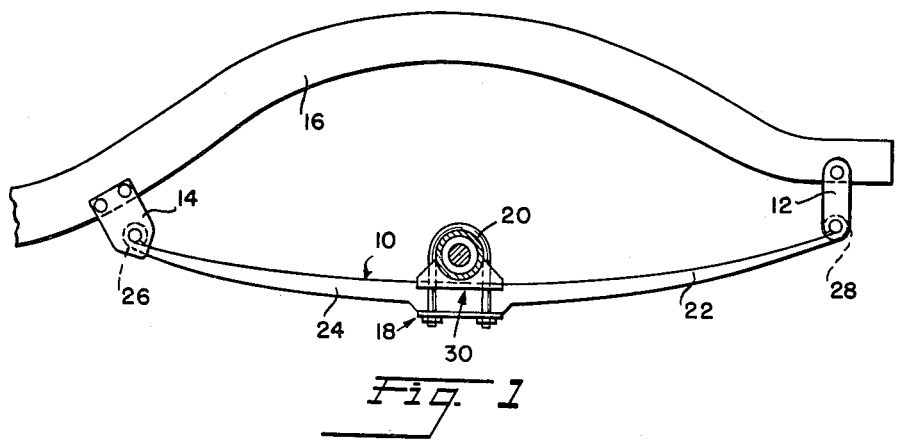
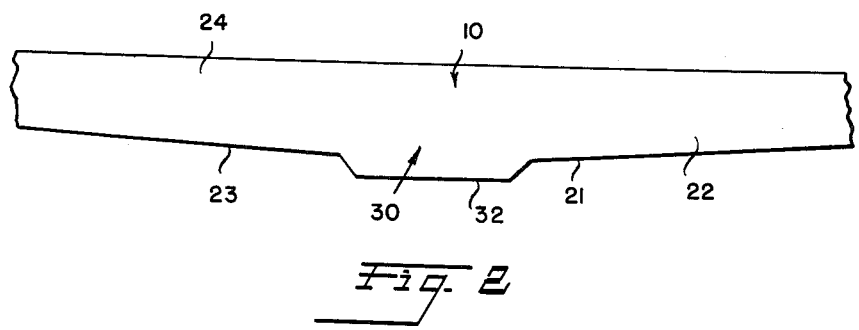
INVENTORS
FREDERICK T. ROWLAND
BY ROBERT R. GREENE
Strauch, Nolan + Neale
ATTORNEYS

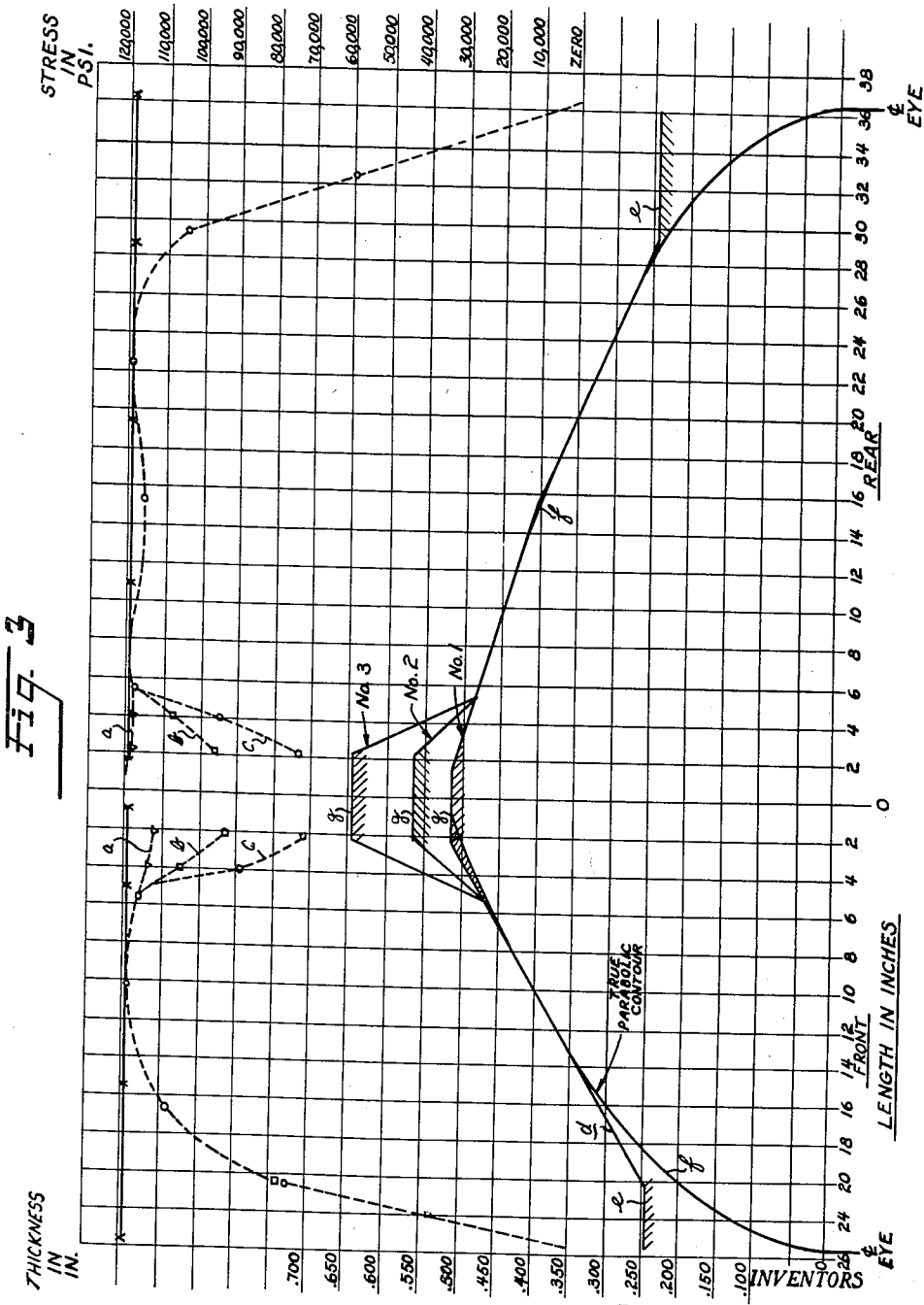

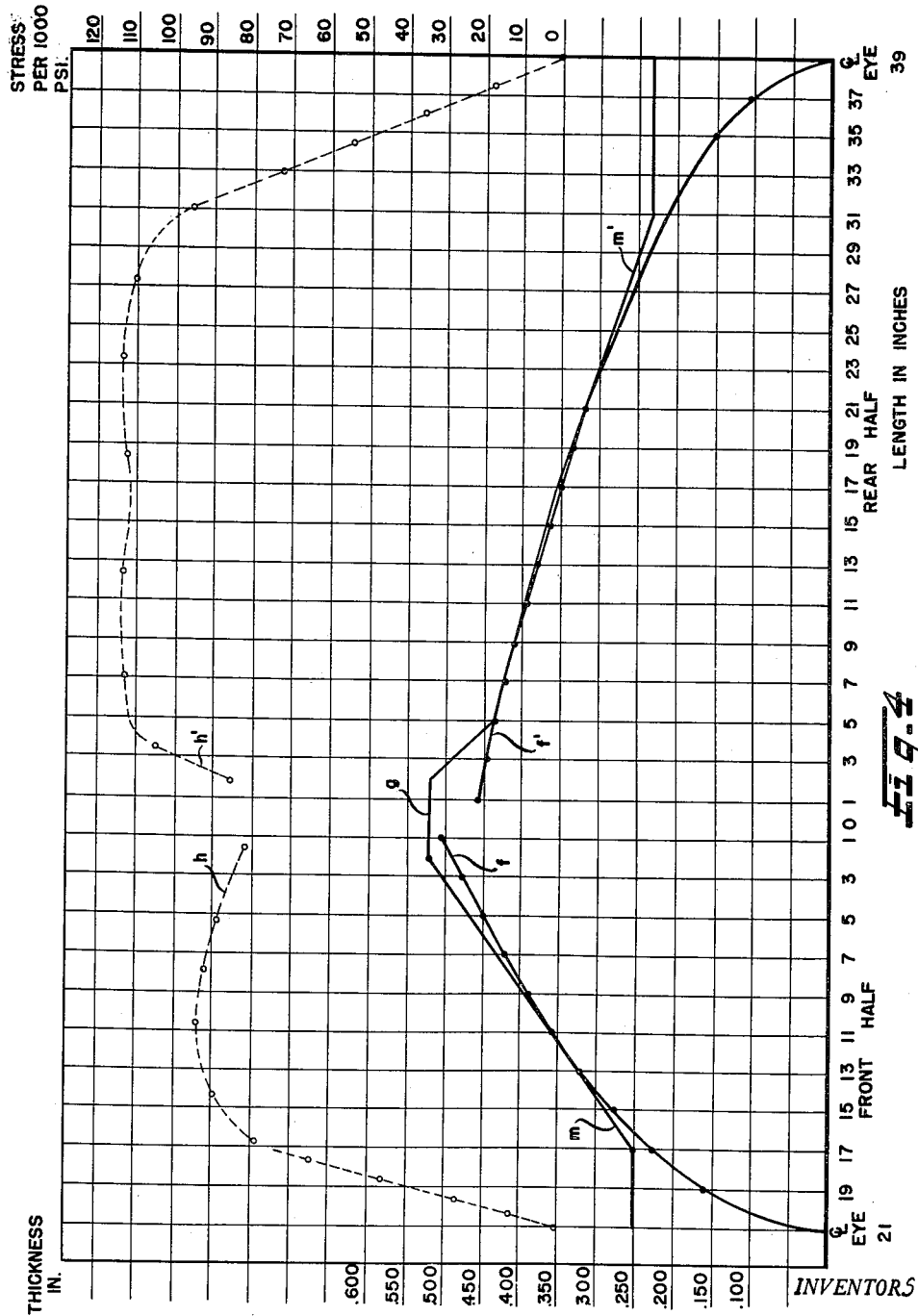

United States Patent Office 3,079,139
Patented Feb. 26, 1963

3,079,139
TAPERED SPRING LEAF
Robert R. Greene and Frederick T. Rowland, New Castle, Pa., assignors to Rockwell-Standard Corporation, Coraopolis, Pa., a corporation of Pennsylvania
Filed Apr. 20, 1960, Ser. No. 23,472
4 Claims. (Cl. 267—47)

The present invention refers in general to vehicle leaf spring suspensions and more especially to a special single tapered leaf spring.

It has been proposed to employ single leaf springs in vehicle suspensions rather than the conventional multi-leaf spring for various practical reasons as, for instance, reducing weight and cost, ease of manufacturing and assembly, etc., but mainly for overcoming more technical difficulties and problems encountered with conventional vehicle leaf spring assemblies.

Conventional multi-leaf springs embody a variety of inherent disadvantages of which interleaf friction may be termed the severest as well known in the art.

The ideal solution to this problem would be to employ a single leaf spring which provides the vehicle with the same or improved riding quality and durability as a multi-leaf spring. To reduce this thought to practice certain considerations had to be taken into account and new problems had to be solved not known in multi-leaf spring assemblies.

To this effect it has been proposed to provide a single leaf spring of varying cross section which may be of constant thickness and variable width; constant width and variable thickness; or both.

Of all the prior proposals, a single leaf spring having substantially constant width but variable thickness has been found most satisfactory and the present invention is concerned mainly with tapered single leaf springs of this general type.

In tapered single leaf springs, the taper varies usually from a maximum thickness portion intermediate its ends to a minimum thickness adjacent its ends. The ends of the leaf spring may be of constant thickness where spring attaching eyes or the like are provided for load application. The maximum thickness portion of the tapered single leaf spring is usually coincident with the spring seat or saddle area, that is where the spring is attached or anchored to the axle.

It has been found that most tapered single leaf spring failures occurred at this particular spring seat area, apparently because of a fretting condition and stress corrosion in this area, and the invention here is directed to a substantial reduction of stress at this point to remedy the situation.

Accordingly, it is the main object of the present invention to provide a single tapered leaf spring of substantially constant width but variable thickness having a spring seat attaching area of such shape and increased cross section as to appreciably reduce the stresses at or near the axle clamping section to prevent spring failure at that point.

Another object of the present invention is to provide a single, tapered leaf spring having taper sections closely approaching parabolic curves and culminating into a section intermediate its ends of abruptly increased thickness, preferably up to about two hundred percent of the greatest parabolic thickness.

A further object of the present invention is to provide a single, tapered leaf spring having a substantially immobilized portion approximately midway between its ends of increased thickness to appreciably reduce stresses at this portion.

Other objects and novel features will become evident from the following description taken in connection with the appended drawings in which:

FIGURE 1 illustrates schematically an embodiment of the invention wherein a single taper or leaf spring according to the present invention is used in a motor vehicle;

FIGURE 2 is an enlarged and exaggerated fragmentary side view showing the intermediate portion of the tapered leaf spring according to the present invention;

FIGURE 3 is a graph showing the proportions of three different tapered leaf spring designs in relation to their thickness and correspondent stresses; and FIGURE 4 is a similar graph showing the proportions of a slightly different spring seat construction.

The present invention is a continuation-in-part of our copending application Serial No. 23,471 entitled "Spring Leaf and Method for Making" filed April 20, 1960, and the present single, tapered leaf spring is preferably made according to the process disclosed in that application but is not necessarily limited thereto.

The above mentioned application discloses and claims a process for single, tapered spring leaves which includes the steps of shot blasting, grinding, heating and taper rolling a spring steel blank; heat treating, cambering and shot peening the so-prepared spring leaf; and thereafter "bulldozing" or presetting this leaf. Other more conventional steps may be included, such as: eye forming where necessary, center hole boring or drilling, coating, etc.

A single tapered leaf spring made according to the above or an equivalent process is shown in FIGURE 1 at 10 rearwardly and forwardly pivotally attached as at shackle 12 and at 14 to a longitudinal vehicle frame member 16. Intermediate its ends the leaf spring 10 is clamped by means of a U-bolt clamping fixture generally indicated at 18 to the transverse vehicle axle housing 20.

It will be noted that the single leaf spring 10 is composed of a rear tapered portion 22 and front tapered portion 24. The leaf is a single length of good quality steel. The ends of the single leaf spring 10 are provided in this instance with attaching eyes 26 and 28. The eyes 26 and/or 28 may be omitted in certain applications, as where the spring ends merely bear on frame or axle parts. It will be furthermore noted that the thickest portion 30 of the single leaf spring 10 coincides with the axle attaching area in this particular application.

With reference to FIGURE 2, the approximate center portion 30 of the single tapered leaf spring 10 is illustrated as of increased thickness. This increased thickness has been provided at the spring seat attachment area at which surface 32 more or less abruptly departs from the parabolic surfaces 21 and 23 respectively of the taper rolled portions 22 and 24 in order to reduce the stress in this area, as explained and evidenced by reference to the graph of FIGURE 3.

The graph of FIGURE 3 illustrates the stress reduction on three examples indicated as No. 1, No. 2 and No. 3. The true shape of the spring leaf, that is, the relation of its length to its thickness is greatly exaggerated for illustrative purposes although the true dimensions are indicated by length in inches at the bottom starting from a line "O" towards the ends indicated by the eye center-lines and the thickness is indicated at the left. The stress per thousand pounds per square inch is indicated at the right of the graph.

Stress curves $a$—$a$ are correspondent to the No. 1 example, curves $b$—$b$ to the No. 2 example and curves $c$—$c$ to the No. 3 example. Lines $d$—$d$ indicate the tapered portions of the leaf spring corresponding to portions 22 and 24 and lines e—e the eye portions corresponding to numerals 26 and 28. The lower curves f—f indicate the imaginary true parabolic contour of the leaf spring which, as can be seen, is very closely approached by the rolled tapered portions indicated at d—d. The increased center portion 30 of FIGURE 2 is indicated at g.

It will be seen from the graph of FIGURE 3 that in all three examples, the stress under a given load rapidly increases from zero at the point of load application at both ends to 119,000 p.s.i. Throughout the length of the taper portions the stress remains substantially constant as evidenced by the curves to finally decrease at the increased spring seat area g or 30.

For example, a normal tapered leaf spring (No. 1 and curves a—a) had a thickness of .518 inch at the seat area g which introduced in this specific example a designed load of 112,000 and 119,000 p.s.i. respectively at both sides of the seat area g. By increasing the thickness of the leaf at the seat area g to .566 inch (No. 2 and curves b—b), which is .046 inch thicker than required by the theoretical parabolic contour the stress was reduced to 93,000 and 96,000 p.s.i. respectively. By further increasing the thickness at the seat area g to .644 inch, which is .126 inch or 22% thicker than the required theoretical parabolic contour, the stress was again reduced to 72,000 and 74,000 p.s.i. respectively. Additional increase in thickness at the seat area g or 32, which may be in an amount up to 200% of the maximum thickness of the designed normal theoretical or rolled parabolic contour of the spring leaf likewise noticeably reduces the stress further.

It will be noted from the stress pattern in FIGURE 3 that the rate ratio between the front and rear halves of the leaf spring is such as to produce a substantially equal level of stresses, but in some instances it may be required to provide a single leaf spring with a rate ratio between the front half and the rear half of the spring which would eliminate the necessity of an increased cross section at the seat portion for either the front or rear half. In other words, the rate of one half of the spring to the other is such that the stresses in one half are low enough as to eliminate the need for an increased cross section at the seat portion at that point. This is illustrated by an example in the graph of FIGURE 4 in which only the rear half of the spring leaf (which has its tapered portions indicated by lines m—m') is provided with an increased seat portion g.

It will be seen from the graph in FIGURE 4 that the stress pattern h—h' for the front half is relatively low as compared to the rear half. The curves f—f' (FIGURE 4) represent the true parabolic contour similar to that of curves f—f in FIGURE 3.

Thus there has been provided a single, tapered leaf spring for vehicle suspensions having a seat attachment area in which the accumulated stresses are considerably reduced at the axle seat area.

In general the present invention provides a seat clamping portion in a single, tapered leaf spring of an increased thickness in an amount from one hundred up to two hundred percent of the maximum thickness required by the designed parabolic contour.

The taper rolling of this novel leaf spring may be accomplished in any well known taper rolling machines having properly designed dies and cams or by the method and apparatus disclosed in our other copending application Serial No. 851,385 filed November 6, 1959, for "Method and Apparatus for Roll Tapering Leaf Springs."

The present invention may be embodied in other specific forms without departing from the essential spirit and characteristic thereof. The present embodiment is therefore to be considered in all respects as illustrative only and not restrictive, the scope of the invention being indicated by the appended claims rather than by the foregoing description.

What is claimed and desired to be secured by United States Letters Patent is:

1. A single leaf spring consisting essentially of a single length of spring metal having a relatively short spring seat section adapted to be secured to one relatively movable vehicle part and an accurately formed considerably longer tapered section that extends from said spring seat section to a terminal for attachment to another relatively movable vehicle part, said tapered section being of substantially parabolic longitudinal contour and of gradually decreasing thickness from its juncture with said spring seat section to said terminal, and said spring seat section being so appreciably thicker than any portion of said tapered section as to provide an abrupt change in metal thickness at said juncture.

2. A single leaf spring as defined in claim 1 wherein the thickness of said spring seat section is up to two hundred percent of the maximum thickness of any portion of said tapered sections.

3. A single leaf spring consisting essentially of a single length of spring metal having a relatively short spring seat section adapted to be secured to a vehicle axle and two oppositely extending accurately formed considerably longer tapered sections that extend from said spring seat section to terminals for attachment to a relatively movable vehicle part, said tapered sections being of substantially parabolic longitudinal contour and of gradually decreasing thickness from their junctures with said spring seat section toward said terminals, and said spring seat section being so appreciably thicker than any portion of said tapered sections as to provide abrupt changes in metal thickness at said junctures.

4. A single leaf spring consisting essentially of a single length of spring metal having a relatively short spring seat section adapted to be secured to a vehicle axle and two oppositely extending accurately formed considerably longer tapered sections that extend from said spring seat section to terminals for attachment to a relatively movable vehicle part, said tapered sections being of substantially parabolic longitudinal contour and of gradually decreasing thickness from their junctures with said spring seat section toward said terminal, and said spring seat section being thicker than any portion of said tapered section and up to two hundred percent the maximum thickness of any portion of said tapered sections as to provide abrupt changes in metal thickness at said junctures.

References Cited in the file of this patent

UNITED STATES PATENTS

| | | |
|---|---|---|
| 1,814,214 | Gross | July 14, 1931 |
| 2,533,511 | Rowland et al. | Dec. 12, 1950 |
| 2,608,752 | Schilling | Sept. 2, 1952 |